(12) United States Patent
Tsai et al.

(10) Patent No.: US 9,256,315 B2
(45) Date of Patent: Feb. 9, 2016

(54) METHOD OF IDENTIFYING PALM AREA FOR TOUCH PANEL AND METHOD FOR UPDATING THE IDENTIFIED PALM AREA

(75) Inventors: Yu-Jen Tsai, Taichung (TW); Hsueh-Wei Yang, Zhubei (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 934 days.

(21) Appl. No.: 13/468,194

(22) Filed: May 10, 2012

(65) Prior Publication Data

US 2012/0293454 A1    Nov. 22, 2012

(30) Foreign Application Priority Data

May 17, 2011 (TW) .............................. 100117214 A
Aug. 11, 2011 (TW) .............................. 100128653 A

(51) Int. Cl.
*G06K 9/00* (2006.01)
*G06F 3/041* (2006.01)

(52) U.S. Cl.
CPC .................................. *G06F 3/0416* (2013.01)

(58) Field of Classification Search
None
See application file for complete search history.

(56) References Cited

U.S. PATENT DOCUMENTS

| | | | | |
|---|---|---|---|---|
| 8,531,425 B2* | 9/2013 | Westerman | ........... | G06F 3/0488 345/156 |
| 8,686,964 B2* | 4/2014 | Rimon | ................... | G06F 3/044 178/18.03 |
| 8,952,899 B2* | 2/2015 | Hotelling | .............. | G06F 3/0304 345/173 |
| 9,041,663 B2* | 5/2015 | Westerman | ......... | G06F 3/03547 345/173 |
| 2002/0015024 A1* | 2/2002 | Westerman | ........... | G06F 3/0235 345/173 |
| 2006/0012580 A1* | 1/2006 | Perski | ..................... | G06F 3/038 345/173 |
| 2009/0095540 A1* | 4/2009 | Zachut | .................... | G06F 3/044 178/18.03 |

FOREIGN PATENT DOCUMENTS

CN    101882042 A    11/2010
TW    201104531 A1    2/2011

* cited by examiner

*Primary Examiner* — Wesley Tucker
(74) *Attorney, Agent, or Firm* — patenttm.us

(57) ABSTRACT

A method of identifying a palm area for a touch panel has steps of: receiving sensing frame information having multiple touching sensing points from the touch panel; selecting one of the touching sensing points; outwardly extending a distance from an outline of the selected touching sensing point to define a searching range; checking whether other touching sensing points are within the searching range; marking the touching sensing points in the searching range and expanding the searching range based on the currently marked touching sensing points; sequentially selecting and checking each touching sensing point if it is within the present searching range; and finally merging all the outlines of the marked touching sensing points to form a final outline as a palm area. Other unmarked touching sensing points are defined as touching reference points.

21 Claims, 16 Drawing Sheets

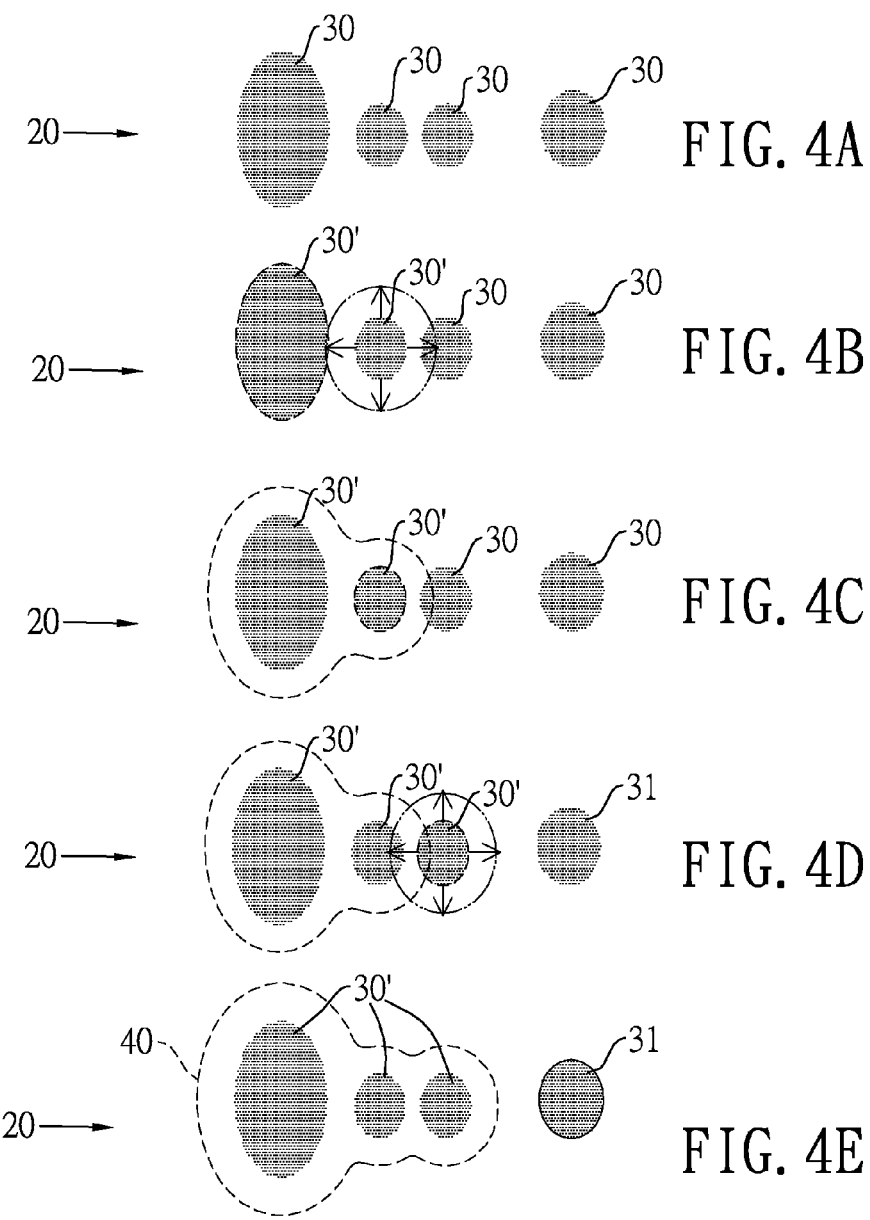

METHOD OF IDENTIFYING PALM AREA FOR TOUCH PANEL AND METHOD FOR UPDATING THE IDENTIFIED PALM AREA

BACKGROUND OF THE INVENTION

1. Field of the Invention

This invention relates to a method of identifying touch points on a touch panel and, in particular, to a method of identifying a palm area for a touch panel and a method for updating the identified palm area.

2. Description of Related Art

Touch panels are very popular input devices applied in an electronic product area or a computer product area. The touch panel can substitute for buttons or keyboards, so electronic products or computer products equipped with the touch panel can be fabricated in a more compact size. The touch panel also provides a hand-writing function allowing a user to directly operate the electronic products.

Touch panels are categorized into many types such as a single touch type or a multi-touch type, wherein the multi-touch type is more popular. The multi-touch panel can only recognize the presence of multiple fingers to determine which function should be performed, such as the screen scaling function and the drag-and-drop function. When the foregoing recognizing method is applied to the small-size touch panel such as the panel of a smart phone, using the fingers to operate the touch panel may not cause any inconvenience. However, as the large-size touch panel comes to the market, the multi-finger based reorganization method may not meet the user's habits. For example, when the user views electronic-books or news via the touch panel, the user may unintentionally put the entire palm on the touch panel. The contact of the palm with the touch panel will cause an error. To improve the identifying methods, U.S. Pat. Publication No. 2011/0012855 discloses a multi-touch device and method for palm rejection. Normally, when a user puts fingers and a palm on a multi-touch panel, the palm will be regarded as a valid touching point. The U.S. patent publication discloses a method for rejecting the touched palm area as shown in FIGS. 14A to 14D, wherein the method comprises:

continuously receiving images including touching points from a touch panel 10;

searching at least one first touching area such as a palm area 40 from the images before fingers 52 or a stylus touching the touch panel 10;

defining at least an untouched area by the at least one first touching area; and recognizing a touch point being out of the palm area 40 as a reference point, wherein the touch point corresponds to a finger touch or a stylus touch as a reference point 31.

For rejecting the palm area 40, the user must touch the touch panel by a palm 51 at first as shown in FIG. 14A to correctly define the palm area 40. With reference to FIGS. 14B and 14C, after the palm area 40 is defined as an ineffective area, the user can operate the touch panel by the fingers 52 or the stylus. Thus positions of the touching reference points 31 can be correctly identified as shown in FIG. 14D. In the foregoing approaches, the user is required to set the palm area 40 in advance. Therefore, the approach indirectly limits the user's operating habits and is not practical enough.

SUMMARY OF THE INVENTION

An objective of the invention is to provide a method of identifying a palm area for a touch panel to correctly recognize the valid touching points on the touch panel.

To achieve the above-mentioned objective, the method of identifying the palm area comprises the steps of:

receiving sensing frame information including multiple touching sensing points from the touch panel;

selecting one of the touching sensing points;

outwardly extending a distance from an outline of the presently selected touching sensing point to form a searching range;

checking whether an outline of any one of other touching sensing points overlaps the searching range;

if so, marking the presently selected touching sensing point, ,and selecting another one of the touching sensing points to return to the step of extending the distance;

if not, selecting another one of the touching sensing points to return to the step of extending the distance until all of the touching sensing points have been checked; and merging all outlines of the marked touching sensing points together to form a final outline as a palm area, and defining other unmarked touching sensing points as touching reference points.

The invention further provides an updating method for tracking the palm area, the method having the steps of:

receiving first sensing frame information at a first time, and identifying a reference palm area and touching reference points from the first sensing frame information by a palm area identifying procedure, wherein the palm area identifying procedure further comprises the steps of:

receiving multiple touching sensing points from the first sensing frame information;

selecting one of the touching sensing points;

outwardly extending a distance from an outline of the selected touching sensing point to form a searching range;

reading the outlines of other touching sensing points, and checking whether an outline of any one of other touching sensing points overlaps the searching range;

if so, marking the touching sensing point, and selecting another one of the touching sensing points to return to the step of extending the distance to update the searching range;

if not, selecting one of the touching sensing points to return to the step of extending the distance until all of the touching sensing points have been checked; and merging all outlines of the marked touching sensing points together to form a final outline as the reference palm area, and defining other unmarked touching sensing points as touching reference points;

receiving second sensing frame information at a second time;

predicting positions where the touching sensing points of the second sensing frame information will appear by a dynamic position prediction procedure based on positions of the touching reference points of the first sensing frame information; and updating the touching reference points with the present touching sensing points if the present touching sensing points of the second sensing frame information appear at the predicted positions.

The invention yet further provides a method for updating the palm area, the method having the steps of: receiving first sensing frame information at a first time, and identifying a reference palm area and touching reference points from the first sensing frame information by a palm area identifying procedure, wherein the palm area identifying procedure further comprises the steps of:

receiving multiple touching sensing points from the first sensing frame information;

selecting one of the touching sensing points;
outwardly extending a distance from the outline of the selected touching sensing point to form a searching range;
reading the outlines of other touching sensing points, and checking whether the outline of any one of other touching sensing points overlaps the searching range;
if so, marking the touching sensing point, and selecting another one of the touching sensing points to return to the step of extending the distance;
if not, selecting one of the touching sensing points to return to the step of extending the distance until all of the touching sensing points have been checked; and
merging all outlines of the marked touching sensing points together to form a final outline as the reference palm area, and defining other unmarked touching sensing points as touching reference points;
receiving second sensing frame information at a second time;
predicting a palm area of the second sensing frame information by a dynamic position prediction procedure based on the reference palm area of the first sensing frame information; and
determining whether touching sensing points of the second sensing frame information appear in the predicted palm area;
updating the reference palm area if the touching sensing points of the second sensing frame information appear at the predicted palm area.

When a user puts the palm on the touch panel and operates the touch panel with fingers or a stylus, the invention is able to correctly recognize a palm area, finger touching points or a stylus touching point upon receiving sensing frames and further to update the recognized palm area and touching points. Thus, even though the finger touching points and the stylus touching point are very close to the palm area, the finger touching points and the stylus touching point can be correctly identified. The user thus can operate the touch panel without particular operating limitations.

BRIEF DESCRIPTION OF THE DRAWINGS

FIGS. 4A to 4E are schematic diagrams of sensing frame information corresponding to FIG. 3.

DETAILED DESCRIPTION OF PREFERRED EMBODIMENT

Figure 1:
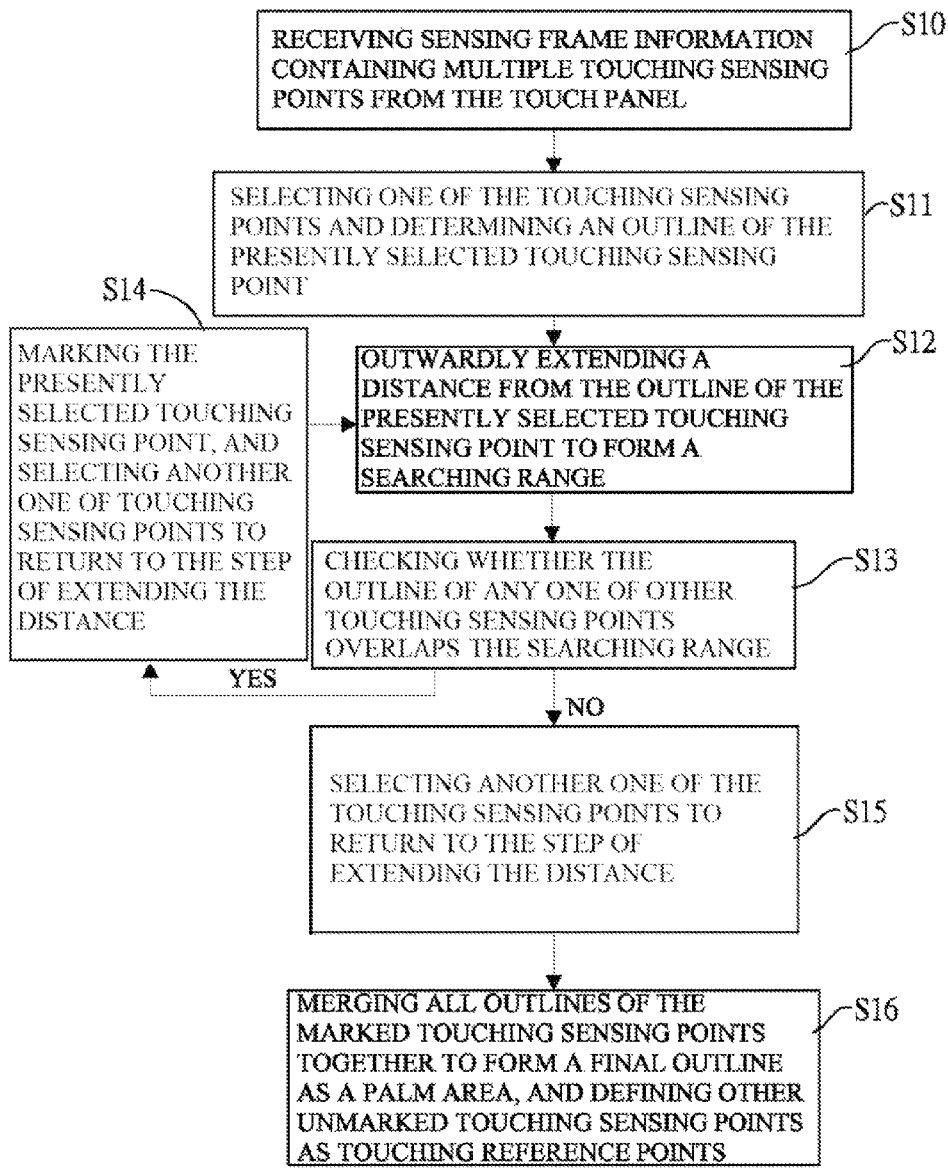
FIG. 1 is a flowchart of a first embodiment of a method of identifying a palm area in accordance with the present invention.
Figure 2A:
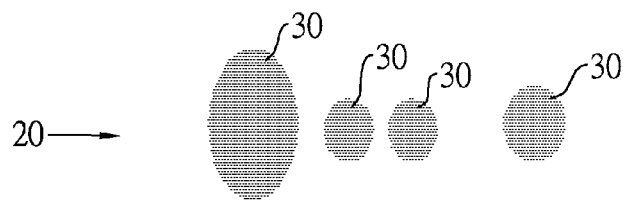
FIGS. 2A to 2E are schematic diagrams of sensing frame information corresponding to FIG. 1.
Figure 2B:
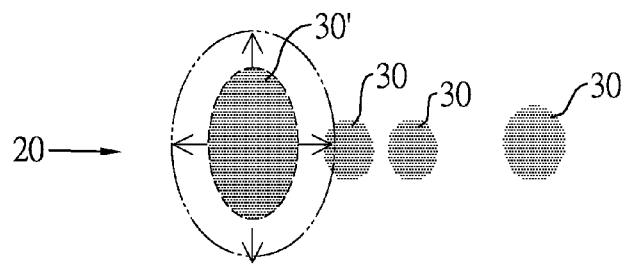
Figure 2C:
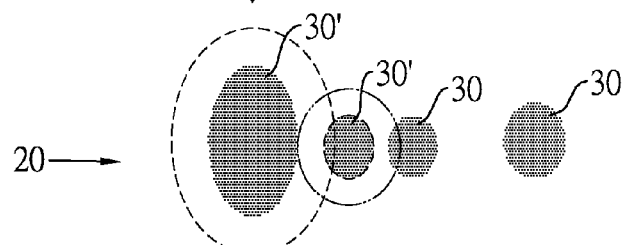
Figure 2D:
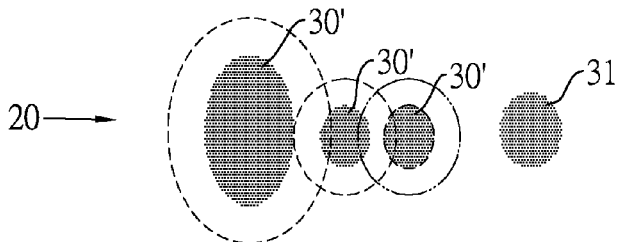
Figure 2E:
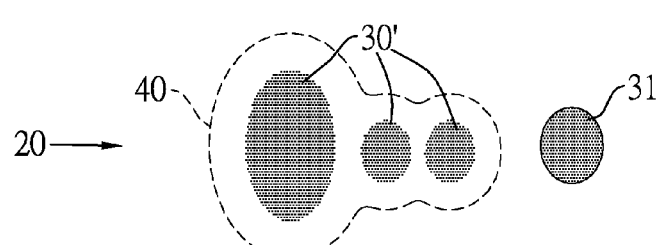
Figure 3:
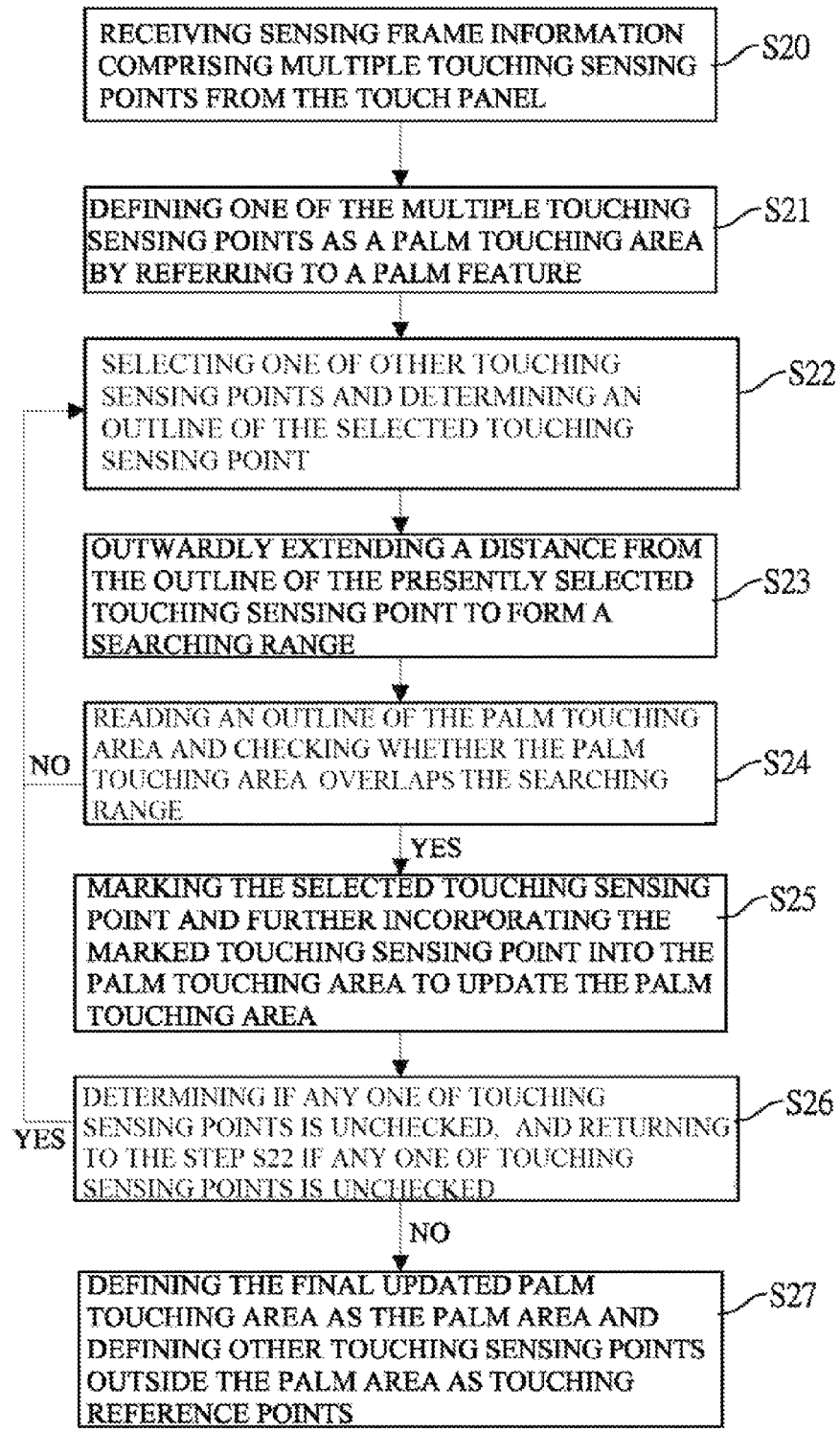
FIG. 3 is a flowchart of a second embodiment of a method of identifying a palm area in accordance with the present invention.

This invention is a method of identifying a palm area for a touch panel by continuously receiving scan frames of the touch panel.

With reference to FIGS. 1 and 2A to 2E, a first preferred embodiment of the method comprises the steps as follows.

Receiving sensing frame information 20 containing multiple touching sensing points 30 from the touch panel (S10).

Selecting one of the touching sensing points 30 and determining an outline of the presently selected touching sensing point 30' (S11). In this embodiment, the first selected touching sensing point 30' is selected by referring to a palm feature. The palm feature comprises a maximum sensing range, a maximum capacitance sensing value, an outline of the palm, a slope value determined by the sensing range and the capacitance sensing value, or a minimum ratio of the moving speed to the sensing range. When the moving speed and sensing range of each sensing point are obtained, the ratio of moving speed to the sensing range of each sensing point can be calculated and the minimum ratio can be used as palm features. Contrary to the palm feature, the first selected touching sensing point can be selected based on a non-palm feature. The non-palm feature comprises a sensing range except the maximum sensing range, a capacitance sensing value except the maximum capacitance sensing value, outlines of fingers or a stylus, a slope value determined by the sensing range and the capacitance sensing value, a ratio of moving speed to the sensing range except to the minimum ratio, etc.

Outwardly extending a distance from the outline of the presently selected touching sensing point 30' to form a searching range (S12). The searching range is defined by outwardly extending a distance from a complete outline of the selected touching sensing point 30' or from a partial outline of the presently selected touching sensing point 30'. If the searching range is defined by referring to the complete outline, that means the searching range is defined by extending a distance from all points around the edge showing the shape of the presently selected touching sensing point 30'. If the searching range is defined by referring to the partial outline, that means the searching range is defined by extending a distance from only a part of points around the edge of the selected touching sensing point 30'.

Reading an outline of any one of other touching sensing points 30, and checking whether the outline of any one of other touching sensing points 30 overlaps the searching range (S13).

If so, marking the presently selected touching sensing point 30', and selecting another one of the touching sensing points 30(S14) to return to the step S12.

If not, selecting another one of the touching sensing points 30 to return to the step S12 until all of the touching sensing points 30 have been checked (S15).

Merging all outlines of the marked touching sensing points 30' together to form a final outline as a palm area 40, and defining other unmarked touching sensing points 30 as touching reference points 31 induced by fingers or a stylus (S16).

Figure 5A:
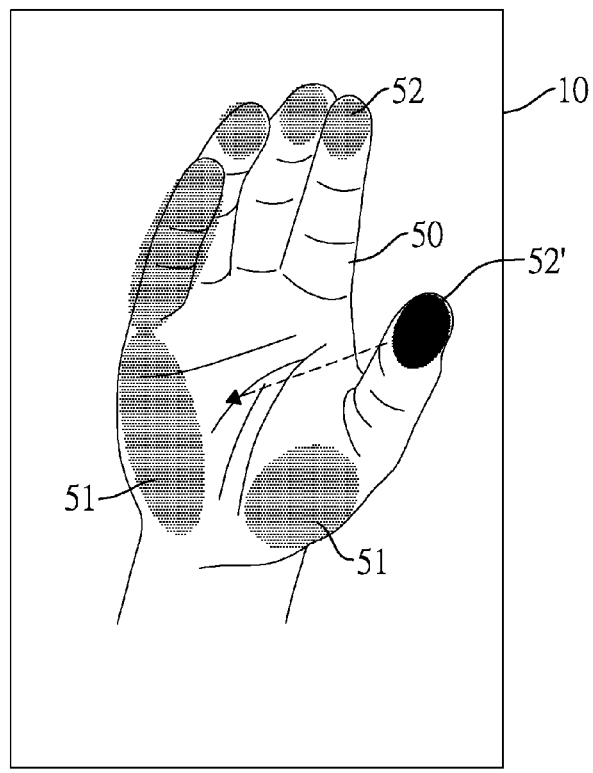
FIGS. 5A and 5B are operational views showing a full palm and a touching contact performed by a finger.
Figure 5B:
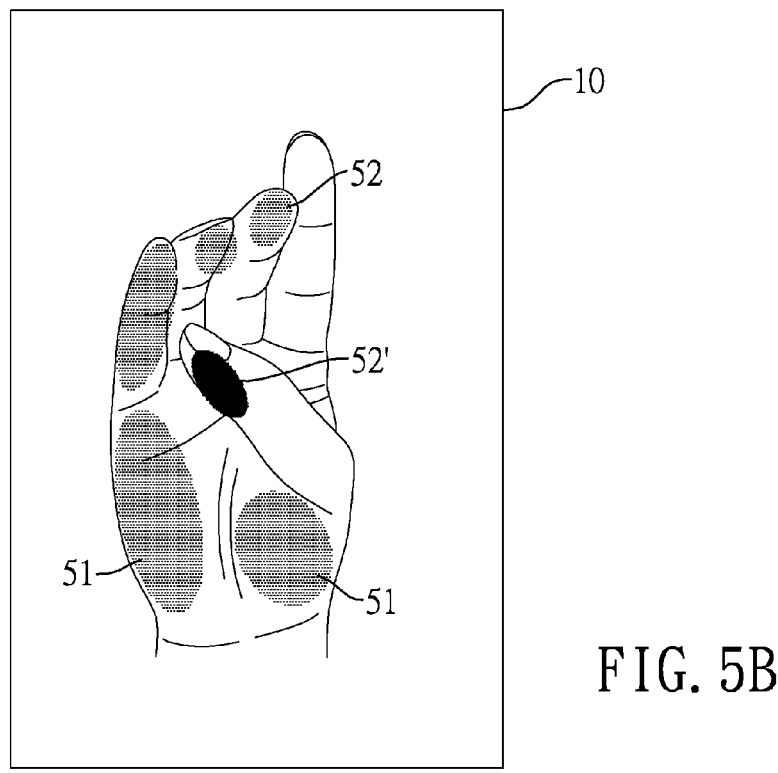
Figure 6A:
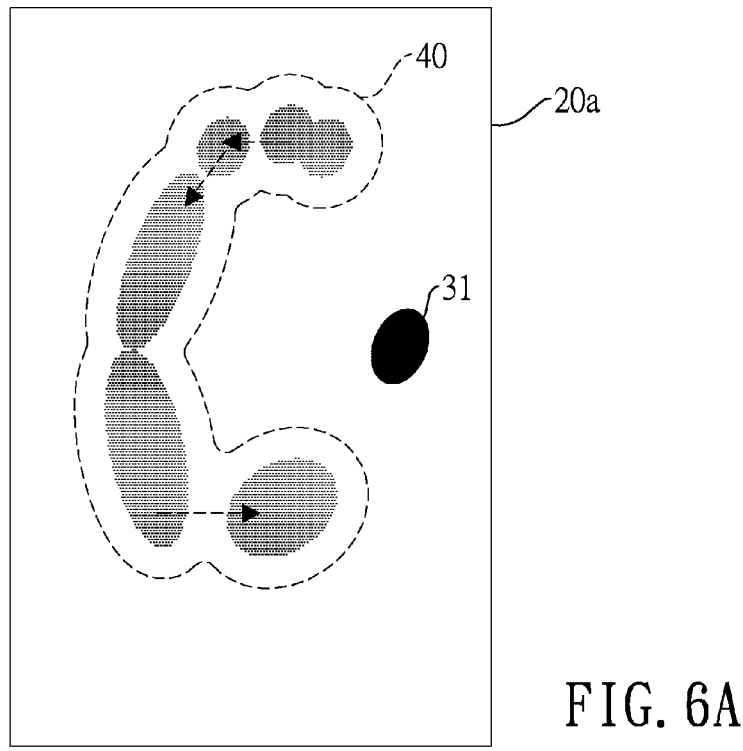
FIGS. 6A and 6B are schematic diagrams of sensing frames respectively corresponding to FIGS. 5A and 5B.
Figure 6B:
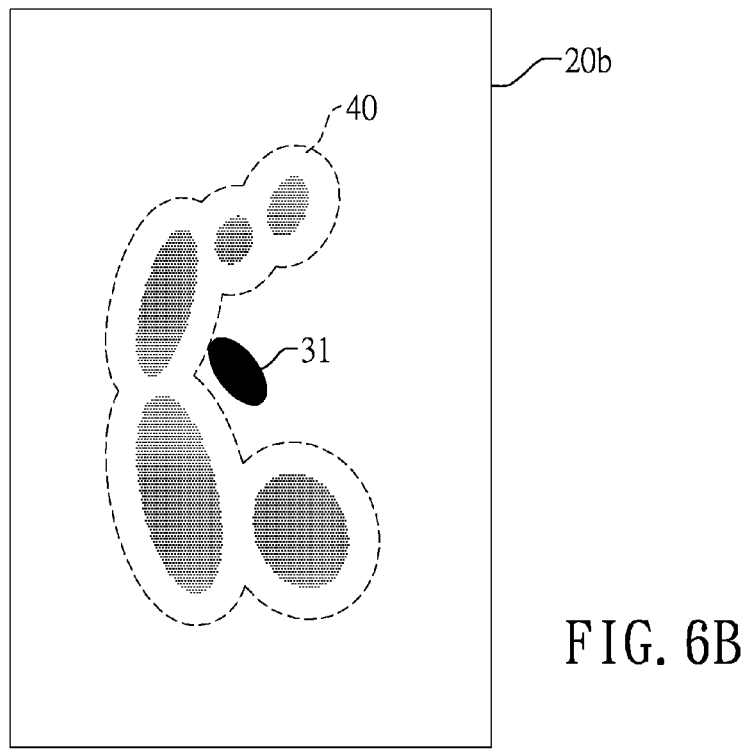

With reference to FIGS. 5A and 5B, since the valid touching reference point 31 in this example is produced by the thumb 52', other touching sensing points except those induced by the thumb 52' are integrated as the palm area 40 in the sensing frames 20a and 20b as shown in FIGS. 6A and 6B. Thus, the touching sensing points 30' are selected based on the non-palm feature and integrated as the palm area 40. Because the touching sensing point corresponding to the thumb 52' does not overlap the searching range, the touching sensing point corresponding to the thumb 52' is not incorporated in the palm area 40 and is defined as the valid touching reference point 31. Therefore, even though a user touches the touch panel 10 by the full palm 50, the palm area 40 still can be correctly identified.

Figure 7A:
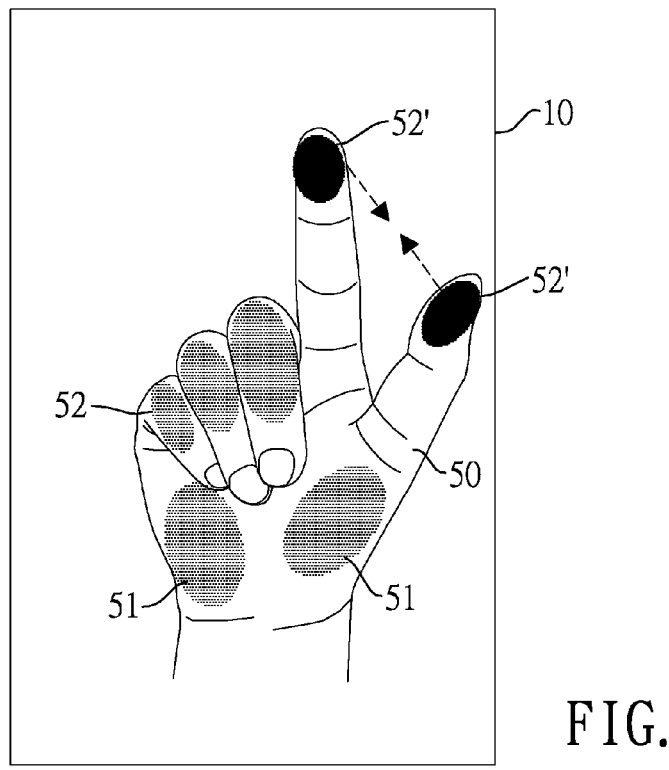
FIGS. 7A and 7B are operational views showing a full palm and multiple touching contacts performed by different fingers.
Figure 7B:
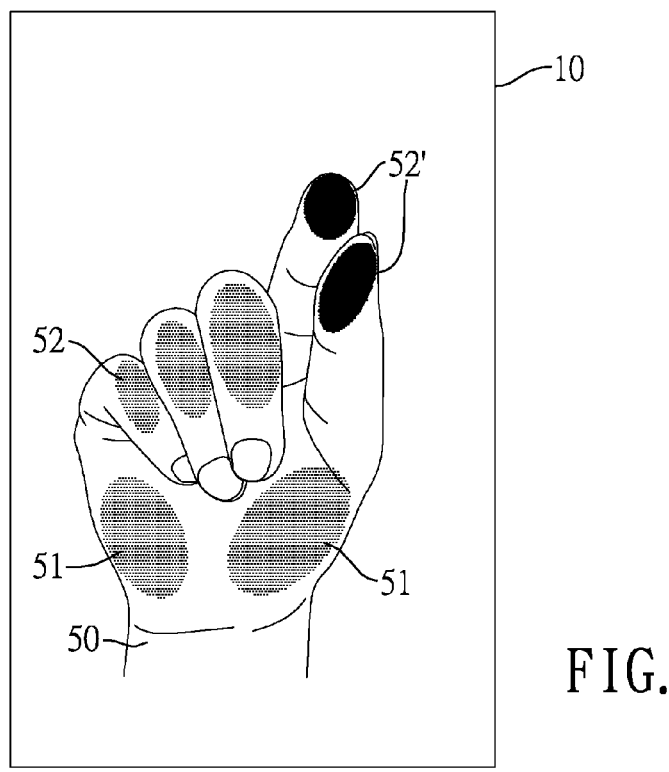
Figure 8A:
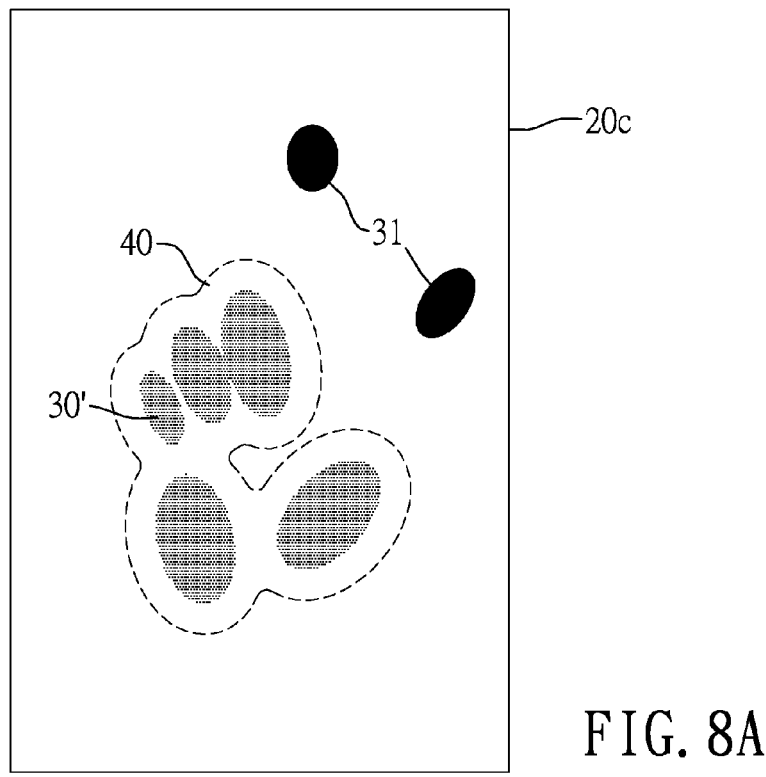
FIGS. 8A and 8B are schematic diagrams of sensing frames respectively corresponding to FIGS. 7A and 7B.
Figure 8B:
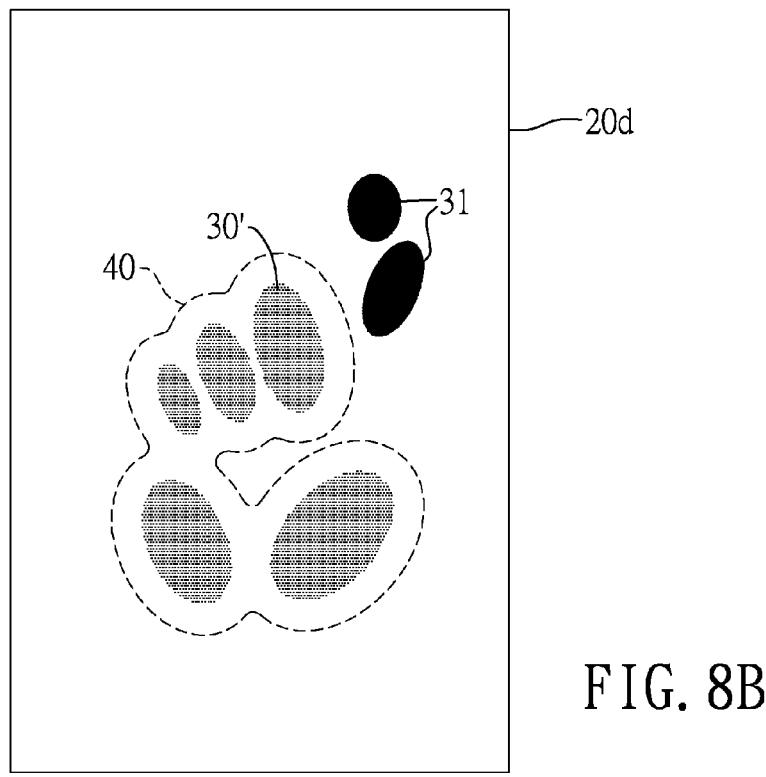

With reference to FIGS. 7A and 7B, a multi-touch gesture is performed by the thumb and the index finger. Except the two touching reference points 31 corresponding to the thumb and the index finger, other touching sensing points 30' are integrated as a palm area 40 in the sensing frames 20c and 20d as shown in FIGS. 8A and 8B. The two touching reference points 31 corresponding to the thumb and the first finger are deemed valid. When the user uses this full palm touching operating gesture to touch the touch panel 10, the available touched palm area 40 can be correctly identified.

With further reference to FIGS. 3 and 4A to 4E, a second embodiment of the method of identifying a palm area in accordance with the present invention comprises the steps as follows.

Receiving sensing frame information 20 comprising multiple touching sensing points 30 from the touch panel (S20).

Defining one of the multiple touching sensing points 30' as a palm touching area by referring to a palm feature (S21). The palm feature comprises a maximum sensing range, a maximum capacitance sensing value, an outline of the palm, a slope value determined by the sensing range and the capacitance sensing value, or a minimum ratio of the moving speed to the sensing range. When the moving speed and sensing range of each sensing point are obtained, the ratio of moving speed to the sensing range of each sensing point can be calculated and the minimum ratio can be used as palm features.

Selecting one of other touching sensing points 30' and determining an outline of the selected touching sensing point 30'(522).

Outwardly extending a distance from the outline of the presently selected touching sensing point 30' to form a searching range (S23).

Reading an outline of the palm touching area, and checking whether the palm touching area overlaps the searching range (S24).

If so, marking the presently selected touching sensing point 30' and further incorporating the marked touching sensing point 30' into the palm touching area to update the palm touching area (S25). Determining if any one of touching sensing points is unchecked (S26), and returning to the step S22 if any one of touching sensing points is unchecked.

If not, returning to the step S22.

Defining the final updated palm touching area as the palm area 40 and defining other touching sensing points 30' outside the palm area 40 as touching reference points 31 induced by fingers or a stylus (S27).

Figure 9:
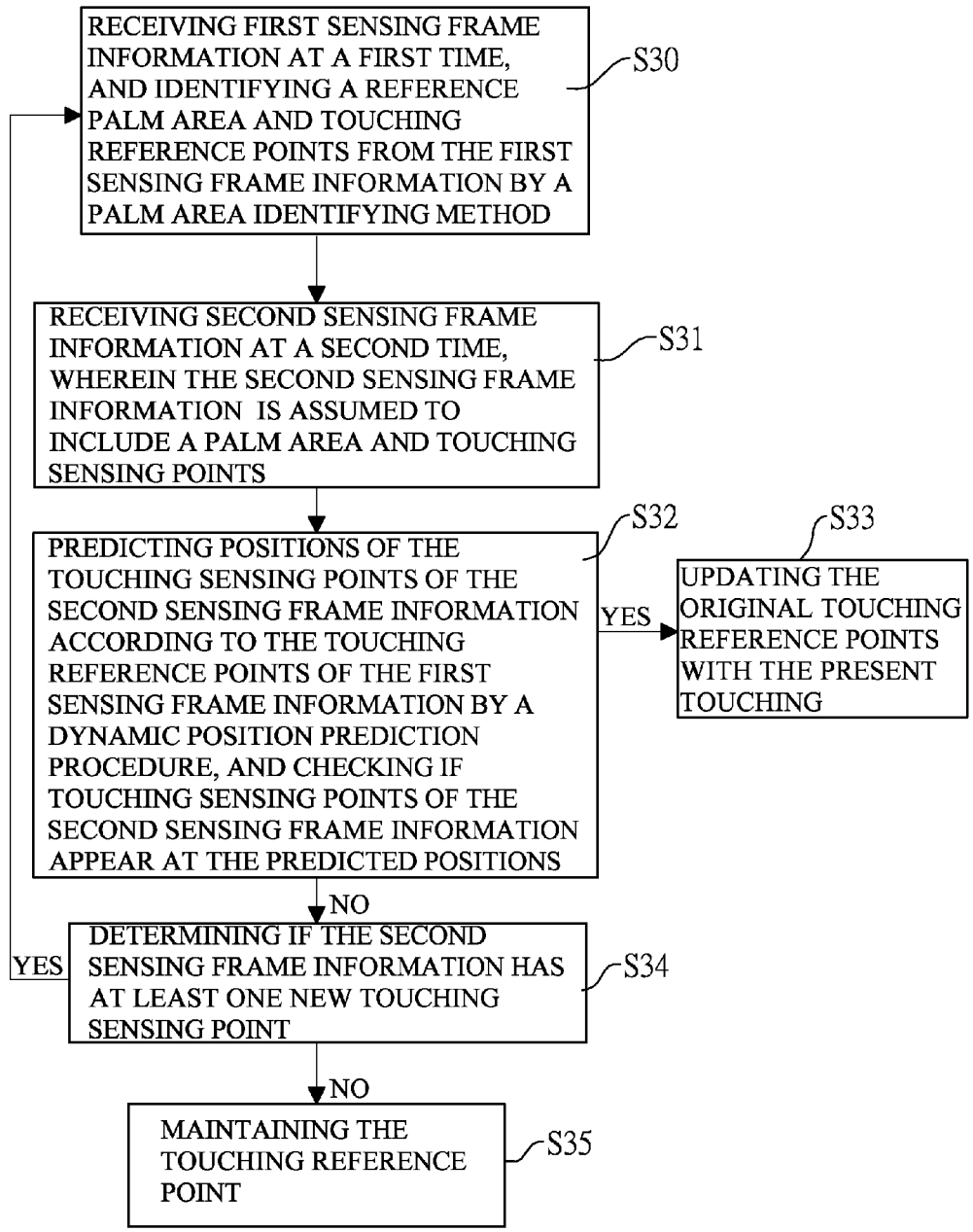
FIG. 9 is a flowchart of a first embodiment of an updating method in accordance with the present invention.
Figure 10A:
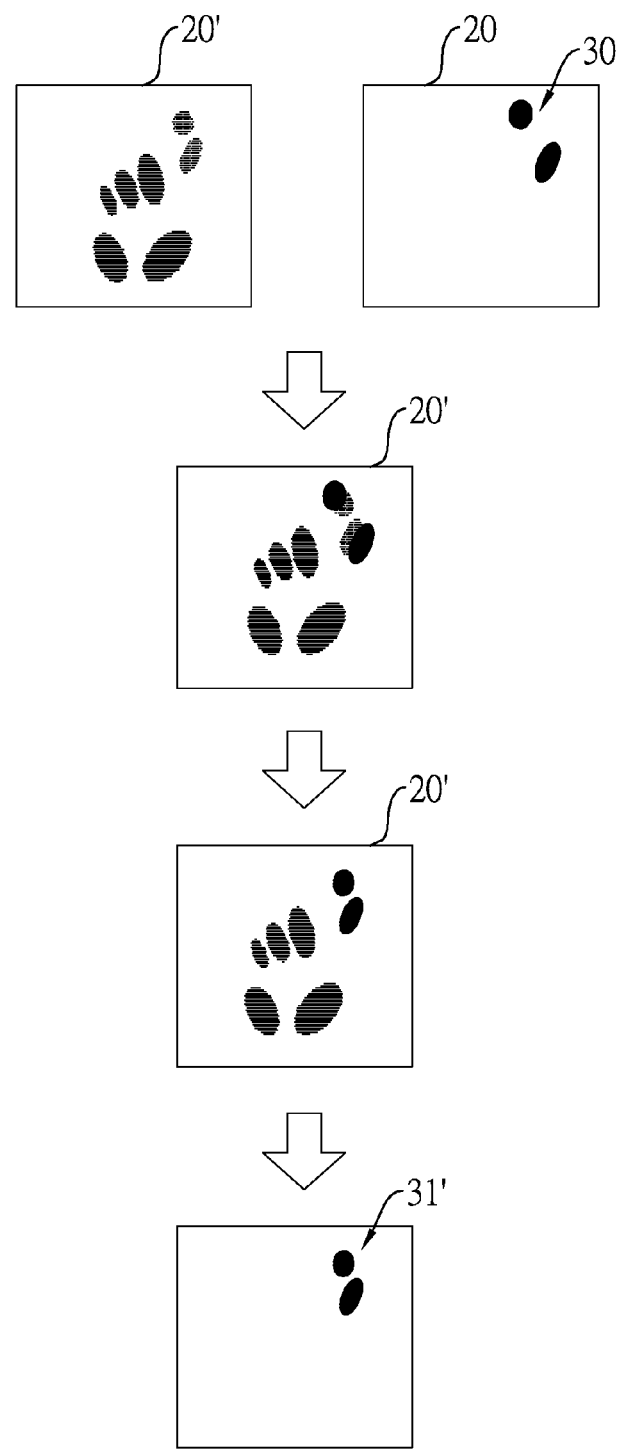
FIG. 10A is a first schematic diagram of sensing frames corresponding to FIG. 9.

In practical use, users will move their palms and fingers on the touch panels. Therefore, the present invention provides an updating method for the palm area. With the updating method, even though the fingers or a stylus are very close to the palm area, the fingers or the stylus still can be correctly recognized. With reference to FIGS. 9 and 10A, a first embodiment of the updating method comprises the steps as follows.

receiving first sensing frame information at a first time, and identifying a reference palm area and touching reference points 31 from the first sensing frame information by a palm area identifying method (S30), wherein the palm area identifying method comprises the steps mentioned above and shown in FIG. 1;

receiving second sensing frame information 20' at a second time, wherein the second sensing frame information 20' is assumed to include a palm area and touching sensing points (S31);

predicting positions of the touching sensing points of the second sensing frame information 20' according to the touching reference points 31 of the first sensing frame information 20 by a dynamic position prediction procedure, and checking if touching sensing points of the second sensing frame information 20' appear at the predicted positions (S32);

updating the original touching reference points 31' with the present touching sensing points if the present touching sensing points of the second sensing frame information 20' appear at the predicted positions (S33);

determining if the second sensing frame information 20' has at least one new touching sensing point (S34);

returning to the step S30 to redefine the palm area and the touching reference points 31 if the second sensing frame information 20' includes at least one new touching sensing point; and maintaining the touching reference point 31 if there is no new touching sensing point in the second sensing frame information 20'(S35).

In this embodiment, the dynamic position prediction procedure directly takes the position of the touching reference point 31 as the predicted position. In applications wherein the finger or the stylus moves slowly on the touch panel, the dynamic position prediction procedure determines if touching sensing points appear near the touching reference points 31, i.e. determines if new touching sensing points of the second sensing frame information 20' overlap the touching reference points 31.

Figure 10B:
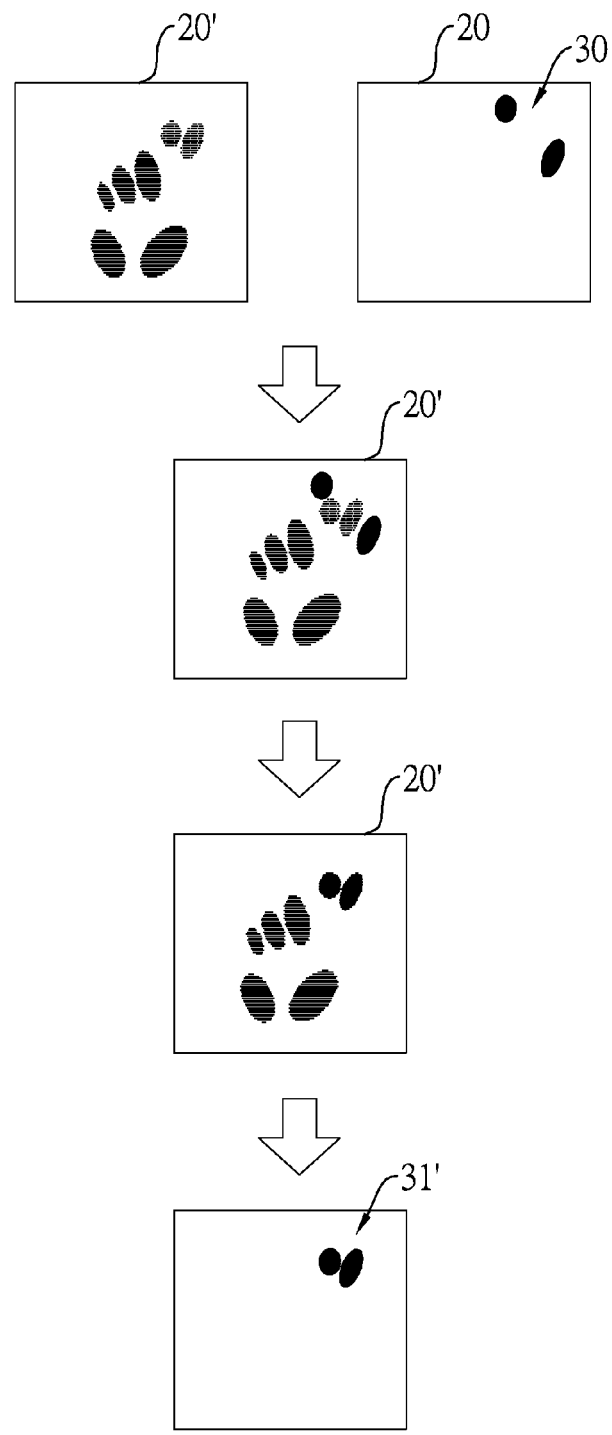
FIG. 10B is a second schematic diagram of sensing frames corresponding to FIG. 9.

Further, the dynamic position prediction procedure can be a shortest-distance prediction approach, a moving-direction prediction approach or other prediction approaches. The shortest-distance prediction approach is suitable for applications wherein the touching sensing points move relatively faster. With reference to FIG. 10B, because the finger touching points in the second sensing frame information 20' and the reference points 31 are at different positions, the distance from each touching sensing point 30 of the second sensing frame information 20' to the touching reference points 31 is calculated. The positions of the touching sensing points 30 with the shortest distances to the touching reference points 31 are chosen as the predicted positions. If new touching sensing points 30 appear at the predicted positions, the touching reference points 31 will be updated by the new touching sensing points 30.

Figure 10C:
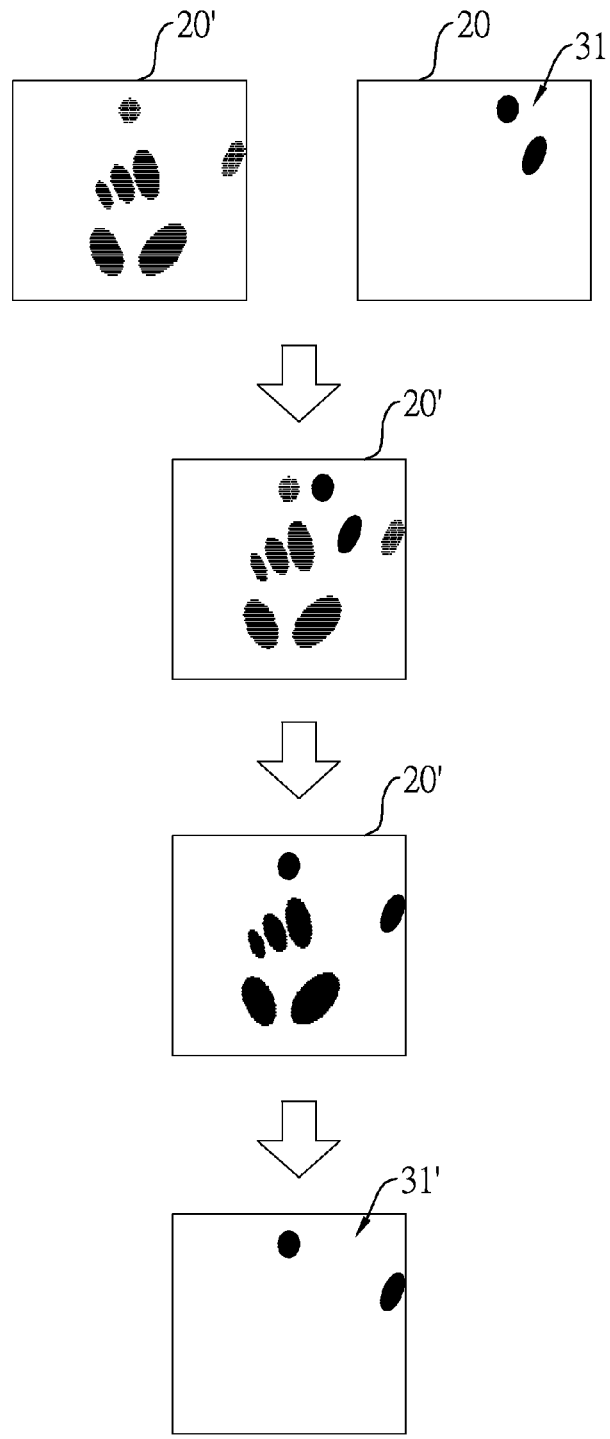
FIG. 10C is a third schematic diagram of sensing frames corresponding to FIG. 9.

With reference to FIG. 10C, the moving-direction prediction approach is applied in situations that the touching sensing points move much faster to continuously track position information of the finger touching points from a plurality of sensing frames during a first time and a second time. The direction prediction approach tracks moving directions of the finger touching points, predicts positions where the finger touching points of the second sensing frame information 20' are going to be located based on the moving directions, thus determines whether the original touching reference point 31 should be updated.

Figure 11:
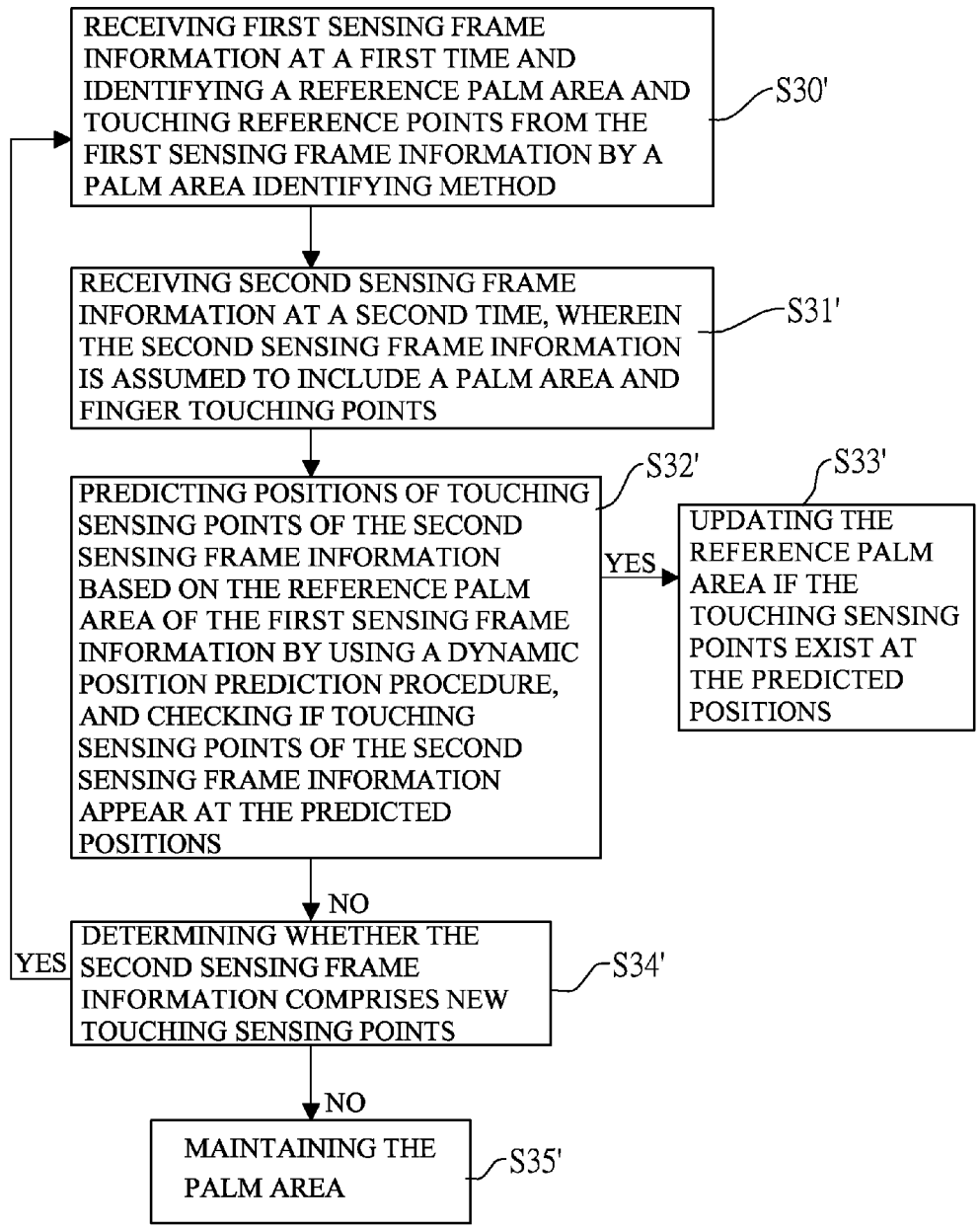
FIG. 11 is a second embodiment of a flowchart of an updating method in accordance with the present invention.
Figure 12:
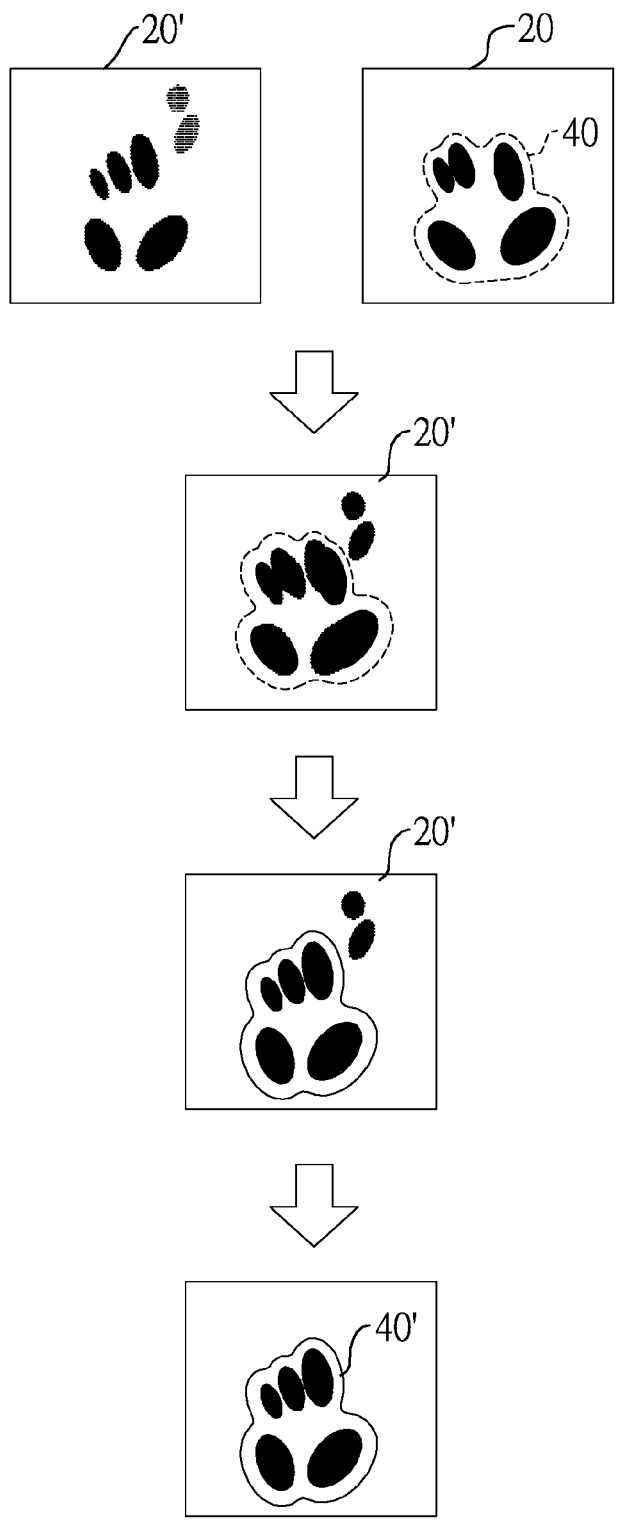
FIG. 12 is a schematic diagram of sensing frames corresponding to FIG. 11.

With reference to FIGS. 11 and 12, a second embodiment of an updating method comprises the steps of:

receiving first sensing frame information at a first time and identifying a reference palm area 40 and touching reference points from the first sensing frame information by a palm area identifying method (S30'), wherein the palm area identifying method comprises the steps mentioned above and shown in FIG. 1;

receiving second sensing frame information 20' at a second time, wherein the second sensing frame information 20' is assumed to include a palm area and finger touching points (S31');

predicting positions of touching sensing points of the second sensing frame information 20' based on the reference palm area 40 of the first sensing frame information 20 by using a dynamic position prediction procedure, and checking if touching sensing points of the second sensing frame information appear at the predicted positions (S32');

updating the reference palm area 40 if the touching sensing points of the second sensing frame information exist at the predicted positions (S33');

further determining whether the second sensing frame information comprises new touching sensing points (S34') if the touching sensing points do not exist at the predicted positions;

returning to the first step S30' to redefine the palm area and the touching reference point if the second sensing frame information comprises new touching sensing points; and maintaining the palm area 40 if the second sensing frame information does not comprise new touching sensing points (S35').

In the second embodiment of the updating method, the dynamic position prediction procedure directly defines the palm area 40 as the predicted position. In applications wherein the finger or the stylus moves slowly on the touch panel, the dynamic position prediction procedure determines if any touching sensing point appears near the palm area 40, i.e. determines if any touching sensing point of the second sensing frame information 20' overlaps the palm area 40.

Furthermore, the dynamic position prediction procedure can be a shortest-distance prediction approach, a moving-direction prediction approach or other prediction approaches. The shortest-distance prediction approach is suitable for applications wherein the touching sensing points move relatively faster. Because the palm touching points of the second sensing frame information 20' and the palm area 40 are at different positions and do not overlap each other, the distances between each touching sensing point of the second sensing frame information 20' and the palm area 40 are calculated to determine a shortest distance. The position of the touching sensing point having the shortest distance from the palm area is chosen as the predicted position.

The moving-direction prediction approach is applied in situations that the touching sensing points move much faster to continuously receive position information of the palm touching points from a plurality of sensing frames during the first time and the second time. The moving-direction prediction approach records moving directions of the palm touching points, predicts positions where the palm touching point of the second sensing frame information 20' will be located based on the moving directions, thus determines whether the palm area should be updated.

Figure 13:
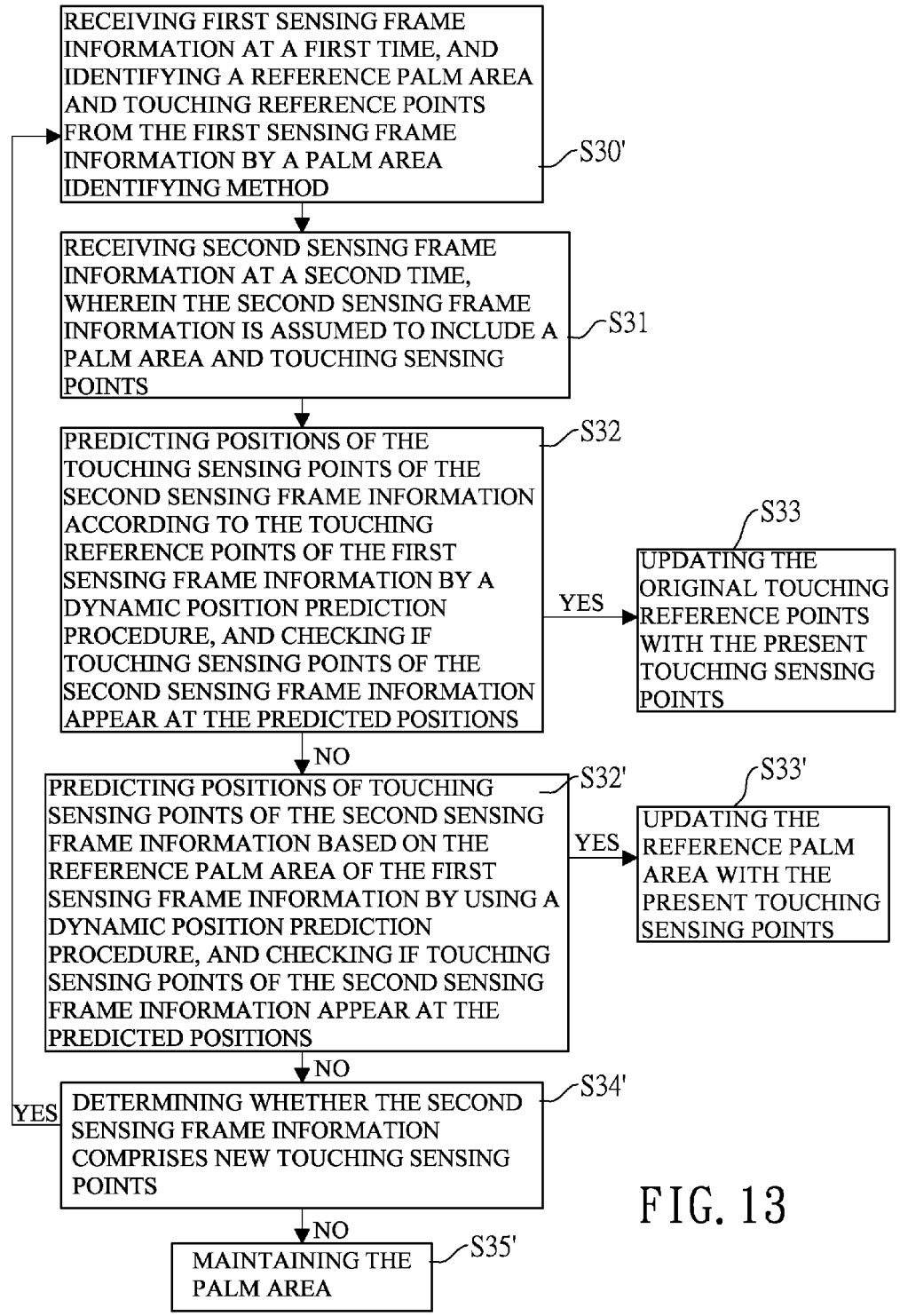
FIG. 13 is a third embodiment of a flowchart of an updating method in accordance with the present invention.
Figure 14A:
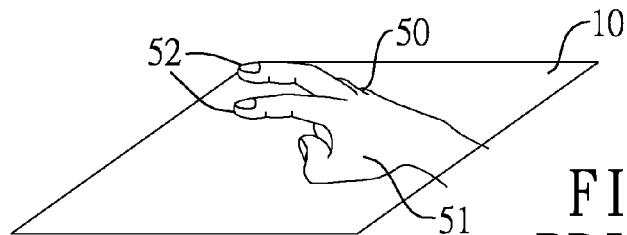
FIGS. 14A to 14D are operational views disclosed by U.S. Pat. Publication No. 2011/0012855.
Figure 14B:
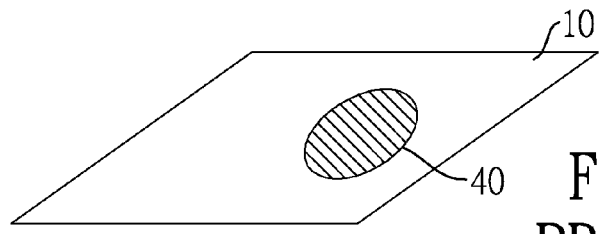
Figure 14C:
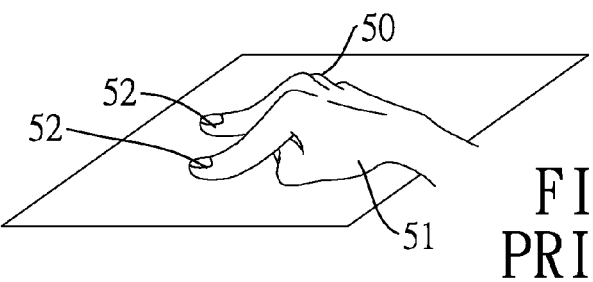
Figure 14D:
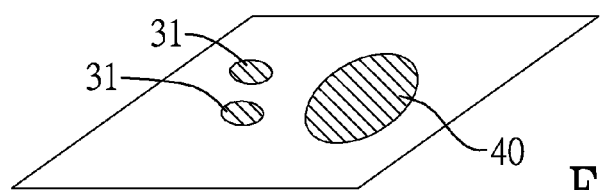

The two updating methods described above can be combined as another embodiment. With reference to FIG. 13, the third embodiment first sequentially executes the steps S30 to S33 shown in FIG. 9 for updating the touching sensing points 31, and then executes the steps S32' to S35' shown in FIG. 11 to update the full palm including the touching reference points 31 and the palm area 40.

As a consequence, this invention finds a palm area as an invalid touching point from multiple touching sensing points induced by a full palm without limiting the user's operation habits. The valid touching sensing points of fingers or a stylus can be correctly identified. With reference to FIGS. 3A and 5A, this invention can accomplish a full palm touching function allowing the users to conveniently operate the touch panel.

What is claimed is:

1. A method of identifying a palm area for a touch panel, comprising the steps of:
   receiving sensing frame information including multiple touching sensing points from the touch panel;
   selecting one of the touching sensing points;
   outwardly extending a distance from an outline of the presently selected touching sensing point to form a searching range;
   checking whether an outline of any one of other touching sensing points overlaps the searching range;
   if so, marking the presently selected touching sensing point, and selecting another one of the touching sensing points to return to the step of extending the distance;
   if not, selecting another one of the touching sensing points to return to the step of extending the distance; and
   merging all outlines of the marked touching sensing points together to form a final outline as a palm area.

2. The method as claimed in claim 1, wherein the first selected touching sensing point is selected based on a palm feature.

3. The method as claimed in claim 1, wherein the first selected touching sensing point is selected based on a non-palm feature.

4. The method as claimed in claim 2, wherein the palm feature is selected from a maximum sensing range, a maximum capacitance sensing value, an outline of the palm, a slope value, or a minimum ratio of moving speed to sensing range.

5. The method of identifying the palm area as claimed in claim 3, wherein the non-palm feature is selected from a sensing range except the maximum sensing range, a capacitance sensing value except the maximum capacitance sensing value, outlines of fingers or a stylus, a slope value, or a ratio of moving speed to sensing range except the minimum ratio.

6. The method as claimed in claim 1, wherein the searching range is defined by outwardly extending the distance from complete outline of the touching sensing point.

7. The method as claimed in claim 2, wherein the searching range is defined by outwardly extending the distance from complete outline of the touching sensing point.

8. The method as claimed in claim 3, wherein the searching range is defined by outwardly extending the distance from complete outline of the touching sensing point.

9. The method as claimed in claim 4, wherein the searching range is defined by outwardly extending the distance from complete outline of the touching sensing point.

10. The method as claimed in claim 5, wherein the searching range is defined by outwardly extending the distance from complete outline of the touching sensing point.

11. The method as claimed in claims 1, wherein the searching range is defined by outwardly extending the distance from partial outline of the touching sensing point.

12. The method as claimed in claim 2, wherein the searching range is defined by outwardly extending the distance from partial outline of the touching sensing point.

13. The method as claimed in claim 3, wherein the searching range is defined by outwardly extending the distance from partial outline of the touching sensing point.

14. The method as claimed in claim 4, wherein the searching range is defined by outwardly extending the distance from partial outline of the touching sensing point.

15. The method as claimed in claim 5, wherein the searching range is defined by outwardly extending the distance from partial outline of the touching sensing point.

16. A method of identifying a palm area for a touch panel, the method comprising the steps of:
   (a) receiving sensing frame information containing multiple touching sensing points from the touch panel;
   (b) defining one of the touching sensing points as a palm touching area based on a palm feature;
   (c) selecting one of other touching sensing points and determining an outline of the selected touching sensing point;
   (d) outwardly extending to distance from the outline of the presently selected touching sensing point to form a searching range;
   (e) reading an outline of the palm touching area and checking whether the palm touching area overlaps the searching range,
   if so, marking the presently selected touching sensing point, further incorporating the marked touching sensing point into the palm touching area, and returning to the step (c);
   if not, returning to the step (c); and
   (f) defining the final updated palm touching area as a palm area.

17. The method as claimed in claim 16, wherein the palm feature is selected from a maximum sensing range, a maximum capacitance sensing value, an outline of the palm, a slope value or a minimum ratio of moving speed to sensing range.

18. The method as claimed in claim 16, wherein the searching range is defined by outwardly extending the distance from complete outline of the touching sensing point.

19. The method as claimed in claim 17, wherein the searching range is defined by outwardly extending the distance from complete outline of the touching sensing point.

20. The method as claimed in claim 16, wherein the searching range is defined by outwardly extending the distance from partial outline of the touching sensing point.

21. The method as claimed in claim 17, wherein the searching range is defined by outwardly extending the distance from partial outline of the touching sensing point.

\* \* \* \* \*